No. 706,258. Patented Aug. 5, 1902.
B. D. SANDERS.
FLOWER SUPPORT OR HOLDER.
(Application filed Jan. 25, 1902.)

(No Model.) 2 Sheets—Sheet 1.

WITNESSES:
C. E. Ashley
John French

INVENTOR:
Bertha D. Sanders
By her Attorney
Willard Parker Butler

No. 706,258. Patented Aug. 5, 1902.
B. D. SANDERS.
FLOWER SUPPORT OR HOLDER.
(Application filed Jan. 25, 1902.)
(No Model.) 2 Sheets—Sheet 2.

UNITED STATES PATENT OFFICE.

BERTHA D. SANDERS, OF NEW YORK, N. Y.

FLOWER SUPPORT OR HOLDER.

SPECIFICATION forming part of Letters Patent No. 706,258, dated August 5, 1902.

Application filed January 25, 1902. Serial No. 91,169. (No model.)

*To all whom it may concern:*

Be it known that I, BERTHA D. SANDERS, a citizen of the United States of America, and a resident of the city, county, and State of New York, have invented certain new and useful Improvements in Flower Supports or Holders, of which the following is a specification.

My invention relates to an improvement in flower supports or holders, and is especially designed to furnish a means by which flowers, ferns, and other ornamental plants can be artistically arranged on dinner-tables or other places in low vases, trays, and like receptacles partly filled with water or, if preferred, without any other receptacle than the holders composing my invention.

My invention consists, essentially, of a flower support or holder composed of a number of separate individual stem holders or supports made of suitable metal and capable of supporting flowers or other ornamental plants therein, either singly or in small bunches, by means of their stems in a variety of artistic arrangements.

My invention will be best understood by reference to the accompanying two sheets of drawings, forming a part of this specification, in which—

Figure 1:
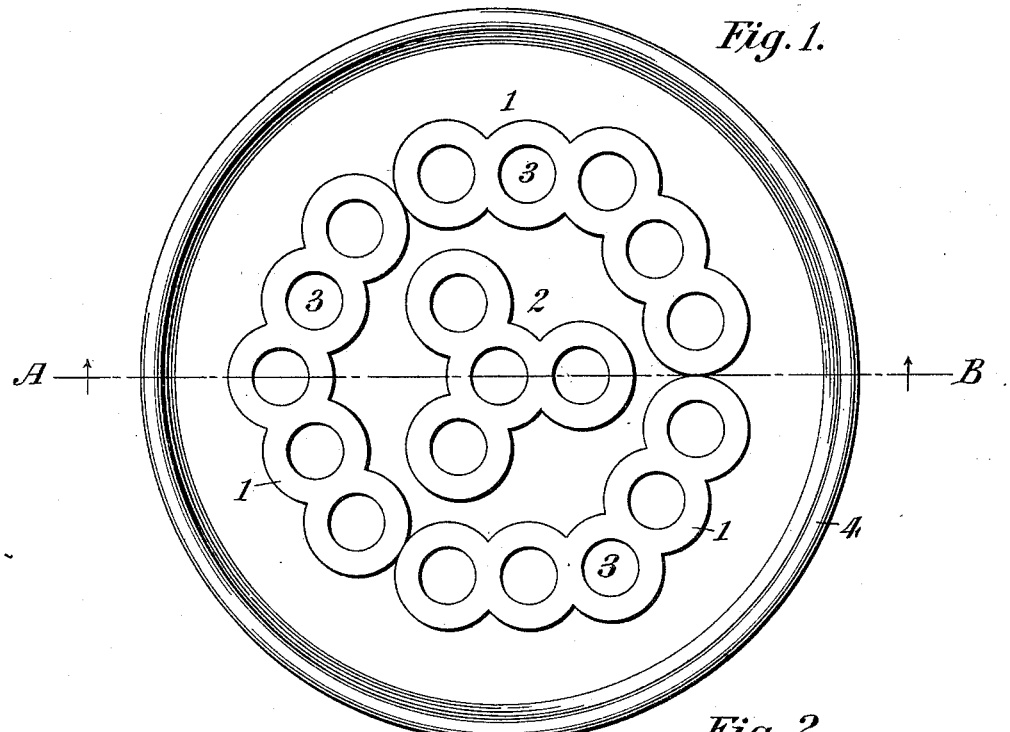
Figure 2:
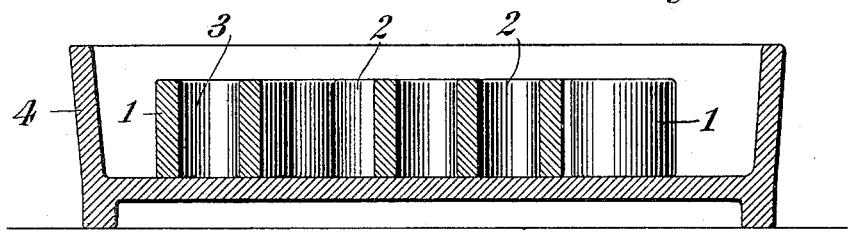
Figure 3:
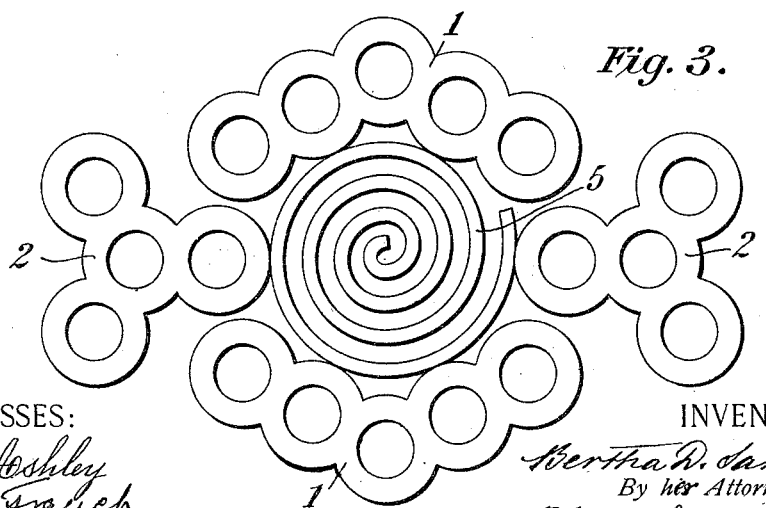
Figure 4:
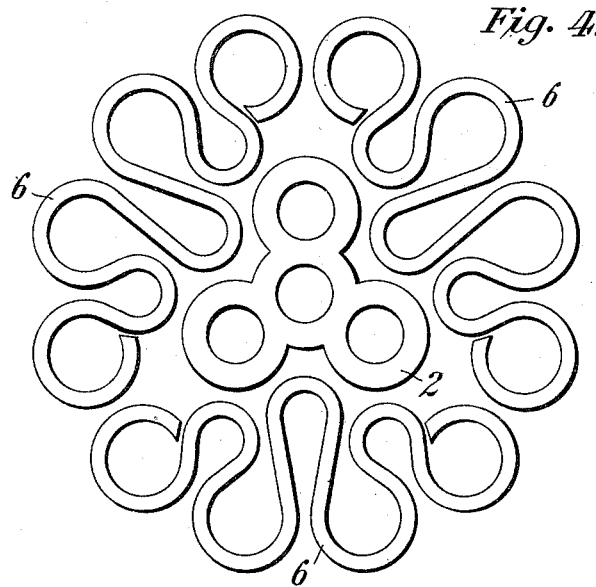
Figure 5:
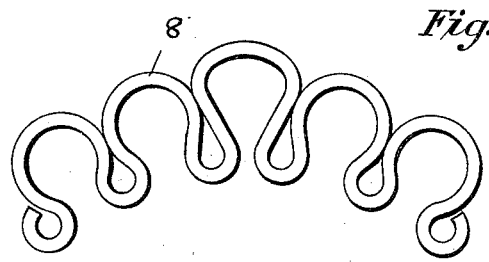
Figure 6:
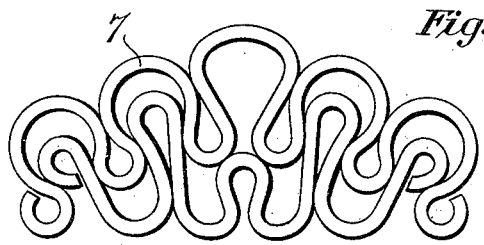

Figure 1 is a plan view of one form of my combination-holder, consisting of a series of stem-holders, with permanent openings in them, arranged symmetrically in a shallow vase. Fig. 2 is a cross-section of the same on the line A B of Fig. 1. Fig. 3 is a plan view of an alternative arrangement, showing a combination of cast-metal and flexible stem-holders. Fig. 4 is a further alternative combination of the same, and Figs. 5 and 6 show alternative forms of construction of the flexible holders.

In the drawings, in the construction shown in Fig. 1 a series of cast-metal segmental sections 1 1 1 is shown arranged around a triangular central holder 2 in a shallow vase. The segmental and triangular sections 1 and 2 are cast from lead or other suitable metal, are provided with the openings 3 3, &c., and are of sufficient height and weight to support the flowers independently of the tray by inserting their stems in the circular openings 3 3. The size of the openings 3 can be varied to suit the diameter of the stems of the flowers to be used provided it is desired to insert only one flower in each opening, or they can be of a fixed size and a sufficient number of flowers inserted in each to approximately fill the same. When the holders are cast from lead or other suitable metal in the forms marked 5, 6, 7, and 8, it will be evident that the separate casts can be made of various shapes and are adapted to various set arrangements with respect to each other and still will be symmetrical. It will also be evident that these casts may be nickel-plated, if desired, or otherwise rendered ornamental of themselves. After the flowers are inserted in the holders in the receptacle sufficient water can be added to keep the flowers fresh.

In Fig. 3 a modification is shown in that the central holder 5, instead of being made of rigid metal, is made of some flexible metal, such as lead or copper, and bent into any desired shape. This form offers the additional advantage of being adjustable in both the size of the openings and the shape of the holder. In this case the flowers are inserted as desired in the annular opening formed by the sides of the bent metal, as shown in the drawings, in this modification, the central section is surrounded by a plurality of independent segmental sections, each having a flower-receiving space with intermediate triangular sections between said segmental sections arranged in a design about said central section.

In Fig. 4 a combination is shown having as a central piece the rigid metal triangular section 2 and as encircling pieces segments of pliable metal of the general form shown in Fig. 1. It will be obvious that by combining the rigid metal pieces with the pliable metal pieces an infinite variety of arrangements of flowers can be made. While I have designed the holder primarily for an arrangement of flowers on tables arranged in low vases, trays, or other receptacles capable of holding sufficient water to keep the flowers fresh, still it will be obvious that the holders can be adapted to various other uses and can be set, if desired, on the table without the receptacle and banked by ferns or in any other manner.

I claim as my invention—

1. The herein-described flower-holder, comprising a flexible strip bent into a series of convolutions, such convolutions combining to form intervening flower-receiving spaces.

2. The herein-described flower-holder, having a convolute flower-receiving space.

3. The herein-described flower-holder, comprising a central section having a flower-receiving space, and a series of independent segmental sections, each provided with a series of flower-receiving spaces, and arranged in a design about said central section.

4. The herein-described flower-holder, comprising a central section having a flower-receiving space, a plurality of independent segmental sections, each having a flower-receiving space, said independent sections being arranged in a design about said central section and intermediate triangular sections arranged between said segmental sections.

5. The herein-described flower-holder, comprising a flexible strip bent to produce flower-receiving spaces.

In testimony that I claim the foregoing as my invention I have signed my name, in presence of two witnesses, this 23d day of January, 1902.

BERTHA D. SANDERS.

Witnesses:
ADRIAN H. JOLINE,
MARY E. L. JOLINE.